Dec. 15, 1925.
J. W. TOMLINSON
1,565,687
TIRE DEFLATION SIGNAL APPARATUS
Filed Nov. 3, 1922    3 Sheets-Sheet 1
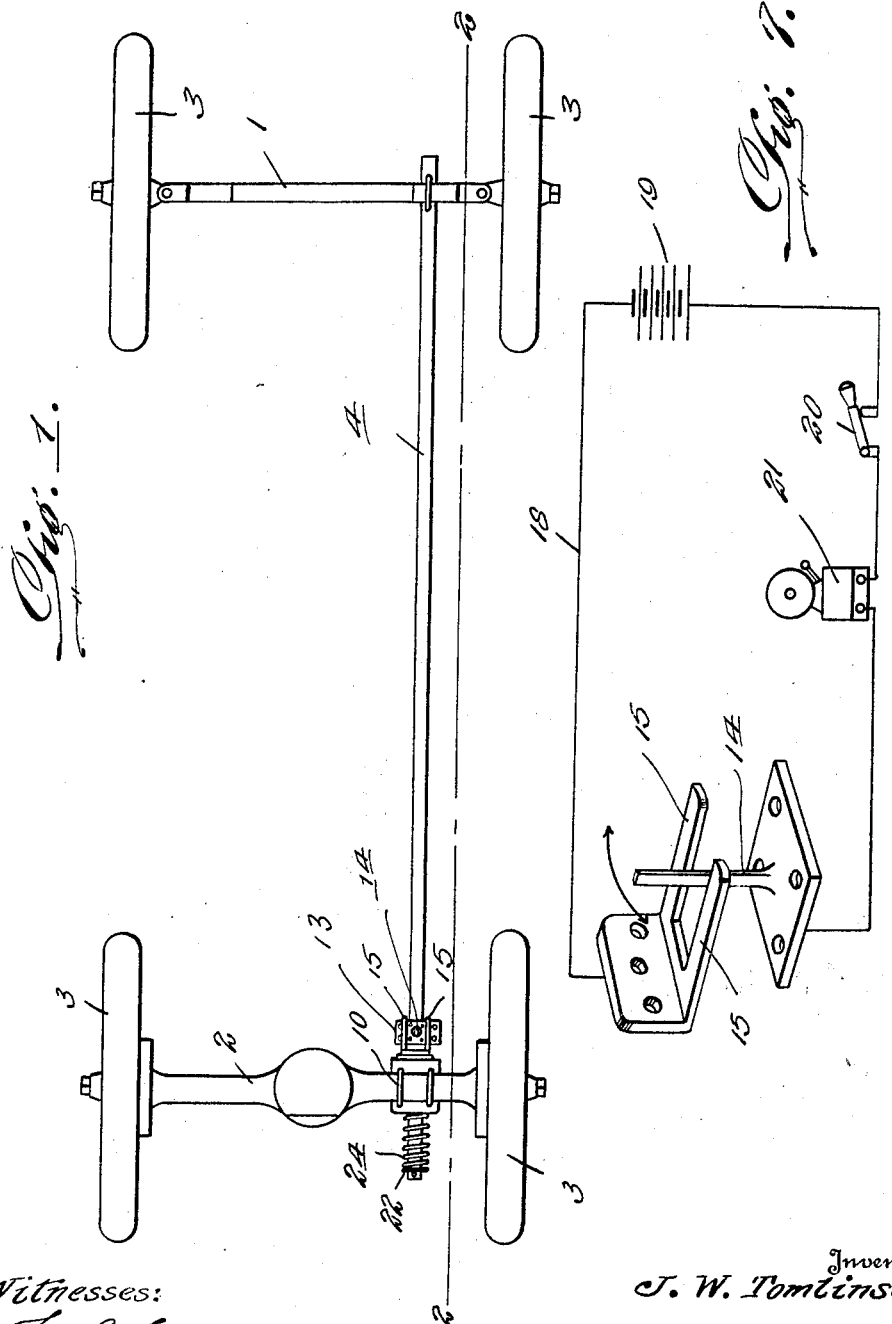
Witnesses:
F. L. Fox.
H. Berman.
Inventor
J. W. Tomlinson,
By Clarence O'Brien
Attorney Dec. 15, 1925.                                              1,565,687
              J. W. TOMLINSON
          TIRE DEFLATION SIGNAL APPARATUS
            Filed Nov. 3, 1922          3 Sheets-Sheet 2
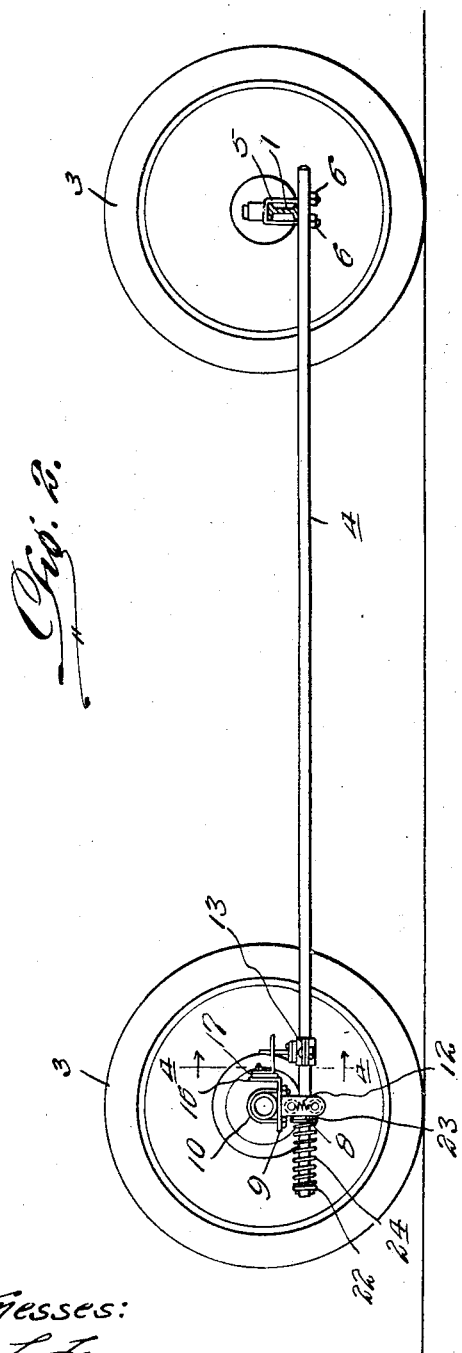
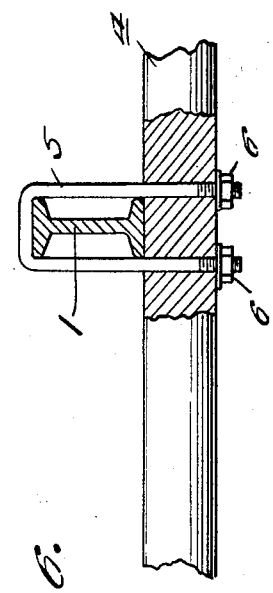
Witnesses:
Inventor
J. W. Tomlinson
By Clarence A. O'Brien
    Attorney

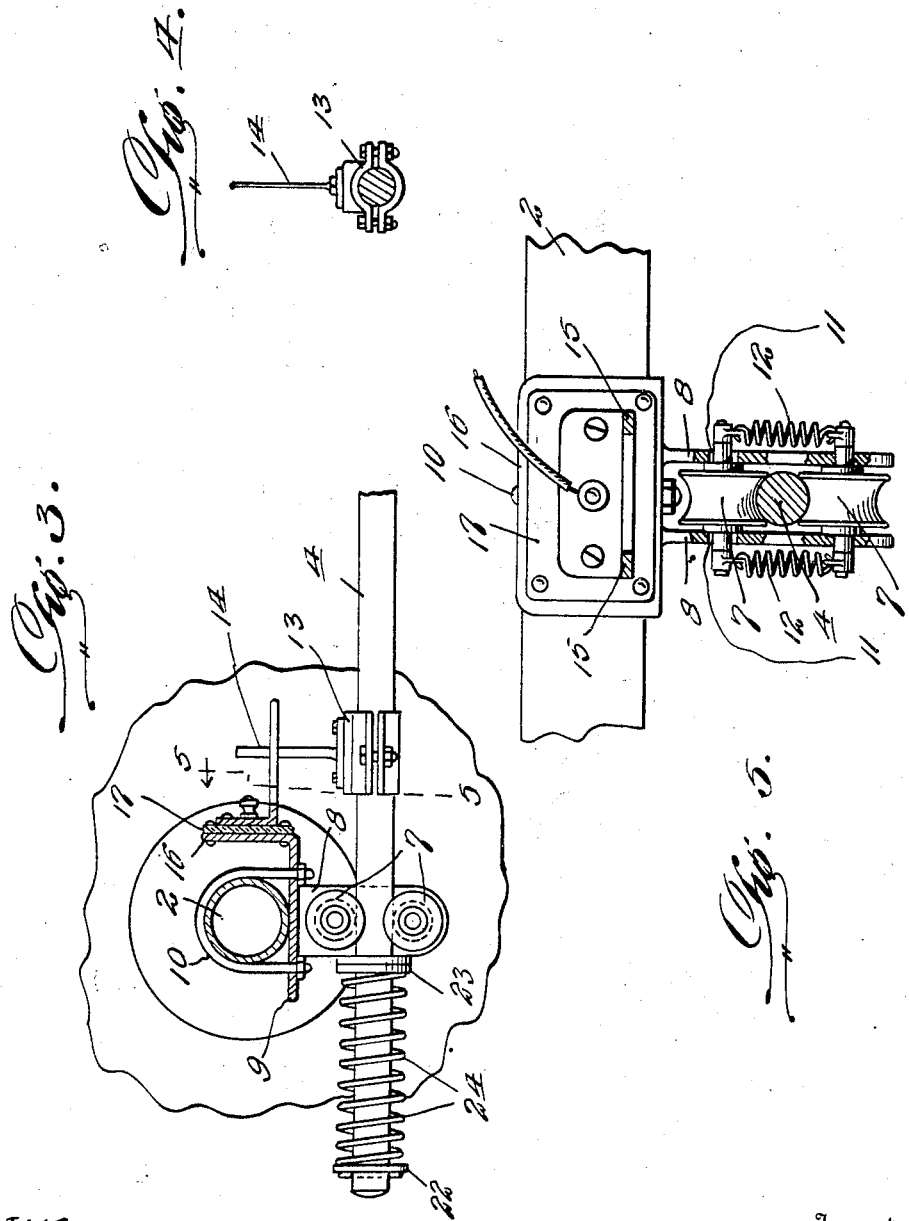

Patented Dec. 15, 1925.

1,565,687

UNITED STATES PATENT OFFICE.

JOHN W. TOMLINSON, OF ST. PETERSBURG, FLORIDA.

TIRE-DEFLATION SIGNAL APPARATUS.

Application filed November 3, 1922. Serial No. 598,713.

*To all whom it may concern:*

Be it known that I, JOHN W. TOMLINSON, a citizen of the United States, residing at St. Petersburg, in the county of Pinellas and State of Florida, have invented certain new and useful Improvements in Tire-Deflation Signal Apparatus, of which the following is a specification.

In carrying out the present invention, it is my purpose to provide a signal apparatus for use on pneumatically tired motor vehicles, which will operate automatically to notify the driver of the vehicle when any one of the tires is deflated, or of a puncture, blow out or the like.

It is also my purpose to provide an automatic tire deflation signal which will embrace the desired features of simplicity, efficiency and durability, which may be installed with minimum cost, and which will embody comparatively few parts, and these so arranged and co-related as to reduce the possibility of the derangement to a minimum.

The nature and advantages of the invention will be better understood when the following detailed description is read in connection with the accompanying drawings, the invention residing in the construction, combination, and arrangement of parts as claimed.

In the drawings forming a part of this application, like numerals of reference indicate similar parts in the several views, and wherein:—

Figure 1—is a top plan view showing my invention installed.

Figure 2—is a section on the line 2—2 of Figure 1.

Figure 3—is an enlarged fragmentary sectional view, showing the mounting of my apparatus at the rear axle.

Figure 4—is a section on the line 4—4 of Figure 2.

Figure 5—is a section on the line 5—5 of Figure 3.

Figure 6—is an enlarged sectional view showing the mounting of the front axle.

Figure 7—is a diagrammatic view showing the circuit connections.

Referring now to the drawings in detail, 1 designates the front axle of a motor vehicle, and 2 the rear axle thereof, each carrying the usual pneumatically tired round wheels 3. Arranged beneath the axles 1 and 2, and extending longitudinally of the vehicle is a pipe or bar 4. The front end of the pipe or bar 4 beneath the front axle is connected to such axle by an inverted U-shaped clip 5, the legs of which extend through the pipe or bar 4, and are secured thereto by nuts 6 threaded upon the lower ends of such legs, as clearly shown in Figure 6 of the drawings.

The rear end of the pipe or bar 4 beneath the rear axle of the vehicle is mounted between rollers 7—7 arranged above and below the bar 4, and journaled in plates 8—8, that depend from the horizontal plate 9, that is fastened to the rear axle by means of inverted U-shaped clips 10, clearly shown in Figures 1, 2 and 3 of the drawings. In the present instance, the axle of the top roller 7 is mounted in slots 11 formed in the plates 8—8 and this axle is connected by means of coiled retractile springs 12 with the outer ends of the axle of the bottom roller 7, the springs acting to maintain the top roller 7 under tension, so that the bar or pipe 4 will be effectively held between the bottom and top rollers 7.

Surrounding the bar 4 in advance of the rollers is a two-part clamp 13, that is equipped with an upstanding circuit pin 14. This pin 14 extends upwardly and is arranged between the legs of a U-shaped contact plate 15. The plate 15 is fastened to a flange 16 formed on the forward edge of the plate 9, and arranged at right angles to the plate. Interposed between the flange 16, and the plate 15 is a strip of insulating material 17.

The pin 14 and the plate 15 form the terminal of an electric circuit 18 that includes a suitable source of electric energy, such as for instance, a battery 19, a switch 20, and an audible signal in the form of a bell 21.

In practice, when the switch 20 is closed, the tires on the wheels 3 being inflated, the pin 14 remains centrally of the space between the legs of the U-shaped plate 15, thereby maintaining the circuit 18 open. When however, one of the rear tires becomes totally or partially deflated, that end of the axle 2 will drop downwardly, causing a slight rotary movement of the contact plate 15 with respect to the pin 14, thereby engaging one of the legs of this plate with the pin 14 for completing the circuit to the signal 21, thus notifying the driver of the deflation of the tire. Should one of the tires on the front wheels 3 become totally or partially deflated, that end of the axle 1 will like-wise drop downwardly, occasioning a slight rotary movement of the pipe or rod 4, thereby engaging the pin 14 with one of the legs of the contact 15, like-wise completing the circuit to the bell 21.

In the present instance, the rear end of the bar 4 projects beyond the rollers 7—7 and carries on its rear end a fixed washer 22. Interposed between the fixed washer 22, and washers 23 that bear against the plate 8 is a coiled spring 24 that acts to hold the pipe or bar in normal position, and for placing an end strain thereon, whereby excessive vibration in the middle of the pipe or bar is overcome.

While I have herein shown and described my device as being positioned between the front and rear axles of a vehicle, and upon a certain side thereof, it is nevertheless to be understood that the device may be positioned upon the opposite sides of the axles as the occasion demands, and further, as found desirable, the contacts 15 may be carried by the front axle 1, the pin 14 being positioned upon the front end of the pipe or bar 4 for engaging these contacts.

Other minor changes may be made in the invention without departing from the spirit and scope of the invention as claimed.

Having thus described the invention, what is claimed as new, is:—

A flat tire detector for an automobile, comprising a bar adapted to be disposed transversely of both axles of the automobile, means for fixedly securing the bar to one axle, means for connecting the bar with the other axle whereby the bar may have rotary movement in respect to the last mentioned axle, a bifurcated terminal carried by the last mentioned axle, and a terminal mounted upon the bar and disposed transversely of the bifurcated terminal, the last mentioned terminal being disposed between the bifurcations, and normally spaced from the inner edges of the bifurcations.

In testimony whereof I affix my signature.

JOHN W. TOMLINSON.